(12) United States Patent
Baum

(10) Patent No.: US 11,485,299 B2
(45) Date of Patent: Nov. 1, 2022

(54) HEAT PROTECTION DEVICE FOR A WHEEL ELECTRONICS UNIT ON A RIM OF A WHEEL OF A VEHICLE

(71) Applicant: Dr. Ing. h.c. F. Porsche Aktiengesellschaft, Stuttgart (DE)

(72) Inventor: Michael Baum, Tiefenbronn-Lehningen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 621 days.

(21) Appl. No.: 16/572,843

(22) Filed: Sep. 17, 2019

(65) Prior Publication Data
US 2020/0122652 A1    Apr. 23, 2020

(30) Foreign Application Priority Data
Oct. 23, 2018   (DE) .................... 102018126405.4

(51) Int. Cl.
*B60C 23/04*       (2006.01)
*B60R 13/08*       (2006.01)
(Continued)

(52) U.S. Cl.
CPC .......... *B60R 13/0869* (2013.01); *B60B 7/065* (2013.01); *B60C 23/0494* (2013.01);
(Continued)

(58) Field of Classification Search
CPC ............. B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464;
(Continued)

(56) References Cited

U.S. PATENT DOCUMENTS 4,471,999 A * 9/1984 Browne ................ B60C 23/18
                                                   301/6.91
7,642,904 B2 * 1/2010 Crano ................ B60C 23/0408
                                                   73/146.2
(Continued)

FOREIGN PATENT DOCUMENTS

CN   108327466 A  *  7/2018  ......... B60C 23/0491
DE   3728043 C1      2/1989
(Continued)

*Primary Examiner* — Andre J Allen
(74) *Attorney, Agent, or Firm* — RatnerPrestia

(57) ABSTRACT

A heat protection device for a wheel electronics unit on a rim of a wheel of a vehicle, having a main body with a fastening portion for fastening to the wheel electronics unit, and at least one heat protection portion for thermally insulating the wheel electronics unit in the fastened position.

14 Claims, 5 Drawing Sheets

(51) Int. Cl.
*G01L 17/00* (2006.01)
*B60B 7/06* (2006.01)
*G01L 19/06* (2006.01)
*H04W 88/02* (2009.01)

(52) U.S. Cl.
CPC .......... *B60R 13/0861* (2013.01); *G01L 17/00* (2013.01); *G01L 19/0681* (2013.01); *H04W 88/02* (2013.01)

(58) Field of Classification Search
CPC ............ B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/147; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 11/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| 9,381,779 | B2* | 7/2016 | Smith | ...................... B64C 25/36 |
| 2013/0084817 | A1 | 4/2013 | Han et al. | |
| 2020/0079161 | A1* | 3/2020 | Close | ...................... B60C 29/06 |

FOREIGN PATENT DOCUMENTS

| DE | 3828163 A1 | 1/1990 | | |
| DE | 3820579 C2 | 5/1990 | | |
| DE | 10236140 A1 | 2/2004 | | |
| EP | 1598218 A1 | 11/2005 | | |
| JP | 2002103931 A | 4/2002 | | |
| KR | 20130003747 U | * | 6/2013 | ............ B60C 15/00 |
| WO | WO-2019195902 A1 | * | 10/2019 | ............ B60B 19/00 |

\* cited by examiner

HEAT PROTECTION DEVICE FOR A WHEEL ELECTRONICS UNIT ON A RIM OF A WHEEL OF A VEHICLE

CROSS-REFERENCE TO RELATED APPLICATION

This application claims priority to German Patent Application No. 10 2018 126 405.4, filed Oct. 23, 2018, the content of such application being incorporated by reference herein in its entirety.

FIELD OF THE INVENTION

The present invention relates to a heat protection device for a wheel electronics unit on a rim of a wheel of a vehicle, to a wheel electronics unit for a rim of a wheel of a vehicle, and to a method for installing such a wheel electronics unit.

BACKGROUND OF THE INVENTION

It is known that wheels of vehicles are intended to be equipped with a wheel electronics unit, in particular in the form of wheel sensor technology. A typical example of such a wheel electronics unit is the monitoring of the tire pressure in the wheel by a corresponding tire pressure sensor as the wheel electronics unit. If the vehicle is a racing vehicle or a sports vehicle in sports use, in addition to the pressure loading the thermal loading is of crucial importance for the operability of the wheel electronics unit. In particular during the sporty driving mode for a vehicle, a large amount of heat arises during sharp braking maneuvers. Said heat arises at the brake disks of the vehicle that are arranged within the rims. By means of heat conduction or primarily by means of heat radiation, said generated heat merges into the rim and onto the inner side thereof. In the known solutions, this leads to the wheel electronics unit present in the wheel rim correspondingly also being exposed to thermal loading.

It is disadvantageous in the known solutions that, in particular in a sporty way of driving with a multiplicity of sharp braking maneuvers, the heat within the wheel chamber or within the rim can increase to such a great extent that short-term overheating of the wheel electronics unit may take place. In the known solutions, this can have the effect that the consecutive carrying out of sharp braking maneuvers leads to the temporary or even long-term defectiveness of the wheel electronics unit. In known solutions, sports cars therefore have to be equipped, for the racing mode or for the sporty driving mode, with a correspondingly costly wheel electronics unit which ensures appropriate failure safety for these individual situations with a high heat loading. If this is not the case, in the known sports vehicles, the wheel electronics unit has to be replaced after racing use, which is associated with a high outlay on installation and correspondingly also with a cost disadvantage.

SUMMARY OF THE INVENTION

It would be desirable to reduce the failure risk of the wheel electronics unit, even in vehicles moving in a sporty mode, in a cost-effective and simple manner.

With the above desire in mind, disclosed herein is a heat protection device, a wheel electronics unit and a method for installing a wheel electronics unit. Further features and details of the invention emerge from the dependent claims, the description and the drawings. Of course, features and details which are described in conjunction with the heat protection device according to aspects of the invention also apply in conjunction with the wheel electronics unit according to aspects of the invention and in conjunction with the method according to aspects of the invention, and vice versa in each case, and therefore, with regard to the disclosure, reference is always, and can always be, made reciprocally to the individual aspects of the invention.

According to aspects of the invention, a heat protection device is provided for a wheel electronics unit on a rim of a wheel of a vehicle. For this purpose, the heat protection device has a main body with a fastening portion for fastening to the wheel electronics unit. Furthermore, said main body is provided with at least one heat protection portion for thermally insulating the wheel electronics unit in the fastened position.

A heat protection device according to aspects of the invention is therefore provided separately from the wheel electronics unit. This refers in particular to the main body which is separate from the wheel electronics unit. Said main body can therefore be provided with the desired heat protection functionality in the heat protection portion. The heat protection in the form of thermal insulation can be ensured here in a very wide variety of ways. The thermal insulation can thus be ensured by increased heat conduction resistance, increased heat transfer resistance or else via increased heat radiation resistance. Of course, different thermal insulating possibilities can also be combined with one another in the heat protection portion in order to further improve the heat protection.

In order also to be able to arrange the heat protection device with the heat protection functionality on the wheel electronics unit in the desired manner, the main body is provided with a fastening portion. Said fastening portion can have one or more partial fastening portions and can be designed both reversibly and irreversibly. It is preferred if, as explained further on, the installation can be carried out with the fastening portion in a tool-free manner or making little use of tools.

It is now therefore possible with a heat protection device according to aspects of the invention to provide heat protection retrospectively on a sensor, which is mounted in an interior space of a rim and is in the form of the wheel electronics unit. For this purpose, the main body of the heat protection device is fastened to the wheel electronics unit. In this position, the heat protection portion now provides the desired thermal insulation.

A multiplicity of advantages can be obtained by forming the main body separately from the wheel electronics unit. Firstly, simple and cost-effective manufacturing of the main body is possible in this manner. For example, use can be made here of an injection molding process which uses thermoplastic material, in particular PBT, in order to provide the thermally insulating effect. By means of the retrospective production or separate production of the main body, retrofitting of already existing wheel electronics systems in the rim is also possible. Not least, it is thereby also possible to adapt the main body to a very wide variety of sensor geometries of the wheel electronics unit, and therefore to use the same concept cost-effectively and simply in a multiplicity of different sensor systems of the wheel electronics unit.

The separate formation of the main body also makes it possible to use standard sensors or standard components for the wheel electronics unit. Independent heat protection within the wheel electronics unit or a complicated coating of same is no longer necessary. Therefore, not only can the heat protection be improved, but the costs for the use of the wheel electronics unit can also be reduced when heat protection devices according to aspects of the invention are used.

Advantages can be afforded if, in a heat protection device according to aspects of the invention, the main body, in particular in the region of the heat protection portion, has at least one spacer for a defined spacing between the main body and an inner side of the rim. Such spacers may also be referred to as spacer shoes or small spacer feet. They serve to maintain a defined distance and therefore a defined air gap with respect to the inner side of the rim even in the event of mechanical action or vibration. The air gap which, in the mounted position of the heat protection device, is now formed between the heat protection portion, on the one hand, and the inner surface of the inner side of the rim, on the other hand, likewise has an insulating effect against heat conduction from the material of the inner side of the rim into the wheel electronics unit. By means of the arrangement of the spacers, mechanical actions or vibrations cannot now have the effect of reducing said air gap. Two or even more such spacers are preferably provided for increased safety and improved definition of said distance.

Advantages are likewise afforded if, in a heat protection device according to aspects of the invention, the fastening portion is designed for a fastening which is tool-free and/or makes little use of tools, in particular as a snap and latching fastening. Such a simple fastening option makes it possible to carry out the fastening rapidly, cost-effectively and above all with little outlay. For example, a clip connection can be designed as the snap and latching connection, said clip connection latching by elastic deformation in an interlocking connection around or on the wheel electronics unit. In combination with a shoe-like design of the main body, pushing over, as it were, in particular in the guided manner explained further on, and final latching in the fastened position can be ensured. Furthermore, the use of snap and latching connections also permits haptic and/or acoustic feedback that the fastening has actually latched in place and the heat protection device is accordingly arranged in the desired position.

It can likewise be of advantage if, in a heat protection device according to aspects of the invention, the heat protection portion is at least partially designed as a heat reflection surface for reflecting radiant heat from an inner side of the rim. Depending on the manner in which the wheel electronics unit is arranged in the interior space of the rim, different heat transport phenomena can lead to the wheel electronics unit heating up. If the wheel electronics unit is arranged in an exposed position above the inner surface of the rim, this can have the effect that, by the inner side of the rim heating up and by corresponding thermal radiation, the wheel electronics unit is heated up. In order to reduce or to avoid this, the heat protection portion can have a heat reflection surface, in particular as a corresponding surface. Said surface is, for example, metal-coated in particular with aluminum portions. Said coating now makes it possible to radiate back thermal radiation which originates from the inner side of the rim and impinges on said heat reflection surface, or to throw back a major part of same such that the heating up of the main body and therefore also the heating up of the wheel electronics unit can be significantly reduced.

Advantages are likewise afforded if, in a heat protection device according to aspects of the invention, the main body, in particular in the region of the fastening portion, has an interlocking portion for interlocking contact connection on the wheel electronics unit. Such an interlocking portion therefore surrounds the wheel electronics unit in particular in a shoe-like manner or as a main body shoe. Gaps between said interlocking portion and the wheel electronics unit are reduced or avoided here. This firstly makes it possible to be able to ensure particularly simple installation since a defined relative position between the main body and wheel electronics unit is predetermined by the interlocking portion. Secondly, simple introduction and reaching of the fastening position can thereby be ensured.

It is likewise advantageous if, in a heat protection device according to aspects of the invention, the main body has a guide portion for a guided movement into a position fastened to the wheel electronics unit. Such a guide portion can correlate, for example, with an interlocking portion. The guide portion serves to ensure the movement of the main body into the fastening position in a guided manner. For this purpose, the guide portion is preferably configured with guide surfaces which are designed in a manner corresponding to corresponding mating guide surfaces of the wheel electronics unit. The installation and the reaching of the fastening position are thereby facilitated and ensured.

A further advantage can be obtained if, in a heat protection device according to aspects of the invention, the heat protection portion has a gap region for forming a defined heat protection gap between the main body and the wheel electronics unit in a fastened position. In this fastened position, an inner heat protection gap is therefore now formed, said heat protection gap ensuring contact freedom between the heat protection portion and the wheel electronics unit. Said inner heat protection gap reduces the contact connection and therefore the heat conductivity in the transition between the main body and the wheel electronics unit. In order to ensure said defined inner heat protection gap, a corresponding correlation with the inner surface of the heat protection portion can be provided by the corresponding outer geometry of the wheel electronics unit.

Further advantages can be afforded if, in a heat protection device according to aspects of the invention, the heat protection portion has a thermally insulating material, in particular integrally with the main body. The entire main body is preferably produced integrally, monolithically or in one piece, i.e. together with the heat protection portion and/or fastening portion. The use of thermally insulating material can increase the heat conduction resistance and at the same time can make possible a simple and cost-effective production possibility, for example by injection molding.

The present invention likewise relates to a wheel electronics unit for a rim of a wheel of a vehicle, having a heat protection device according to aspects of the invention. A wheel electronics unit according to aspects of the invention therefore affords the same advantages as have been explained in detail with respect to a heat protection device according to aspects of the invention.

The present invention furthermore relates to a method for installing a wheel electronics unit according to aspects of the invention, having the following steps:

fastening the wheel electronics unit to an inner side of the rim;

fastening of the heat protection device to the wheel electronics unit by means of at least one fastening portion.

A method according to aspects of the invention therefore affords the same advantages as have been explained in detail with respect to a wheel electronics unit according to aspects of the invention and with respect to a heat protection device according to aspects of the invention. The sequence of the two fastening steps is essentially insignificant here.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may be essential to the invention in each case individually by themselves or in any combination. In the drawings, schematically:

DETAILED DESCRIPTION OF THE INVENTION

Figure 1:
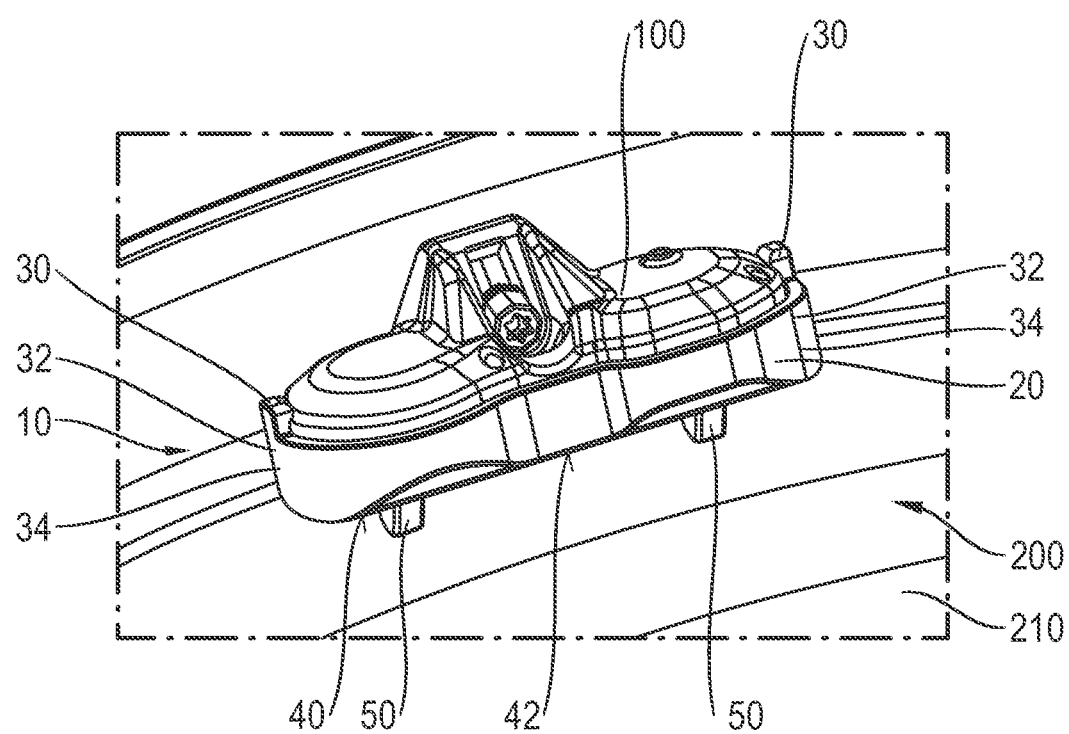
FIG. 1 shows an embodiment of a heat protection device according to aspects of the invention in a wheel electronics unit according to aspects of the invention.
Figure 2:
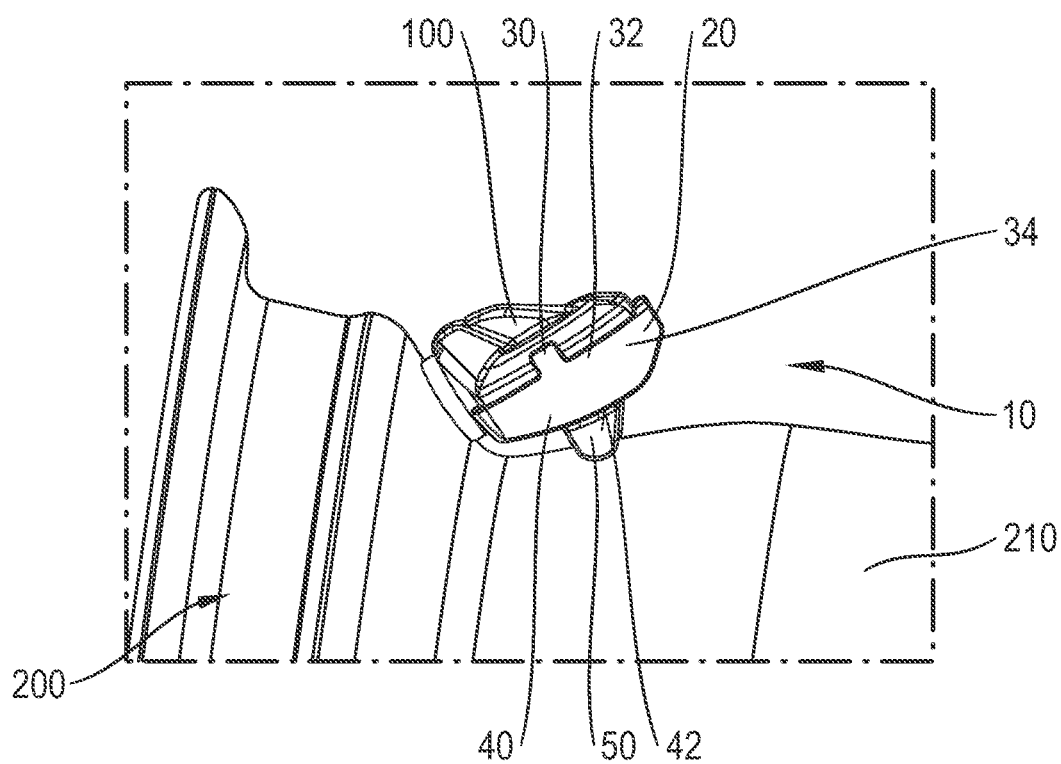
FIG. 2 shows the embodiment of FIG. 1 in a lateral illustration.
Figure 3:
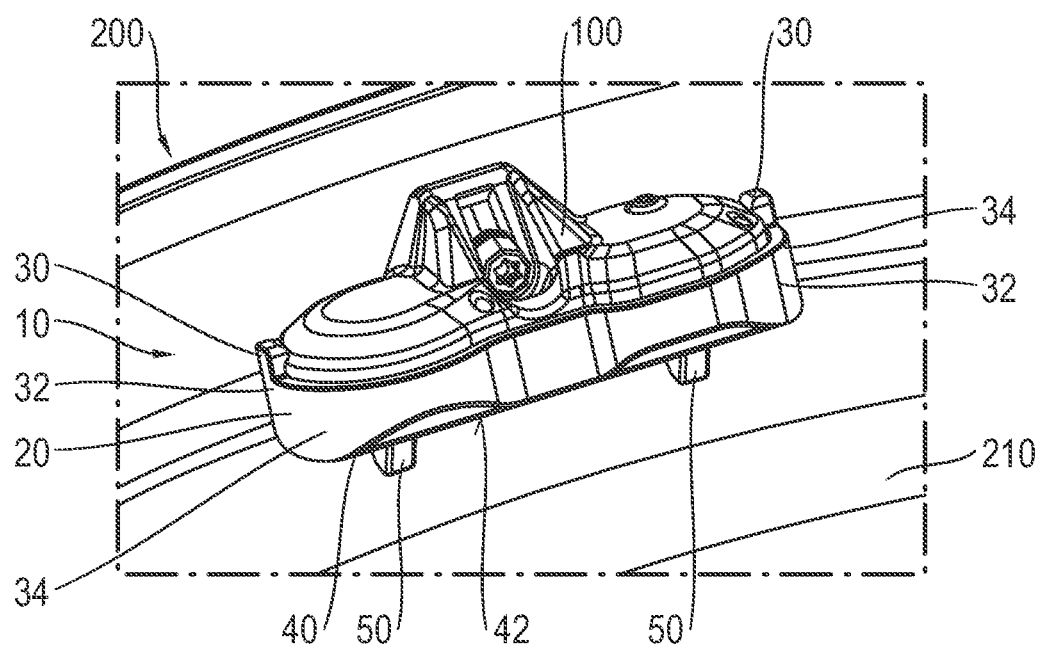
FIG. 3 shows the embodiment of FIGS. 1 and 2 in an enlarged illustration.

FIGS. 1 to 5 show schematic illustrations of a heat protection device 10 according to aspects of the invention which is arranged on a wheel electronics unit 100 according to aspects of the invention on the inner side 210 of a rim 200. Said rim 200 can be used for a sports car in which high thermal inputs into the rim 200 and in particular into the inner side 210 thereof take place during sharp braking maneuvers.

In the event that, by thermal heating up, the rim 200 and in particular the inner side 210 thereof heat up there, a plurality of combined protection mechanisms for thermal insulation of the wheel electronics unit 100 are now provided in the embodiment of FIGS. 1 to 5. The first protection mechanism is ensured by the heat protection portion 40 of the main body 20 by means of corresponding spacers 50. As can be gathered from FIGS. 1 to 4, the heat protection portion 40 of this embodiment of the heat protection device 10 has two such spacers 50 which are designed here as spacer feet. This defined relative positioning with respect to the inner side 210 of the rim 200 therefore permits a defined spacing, and therefore the heat transfer by heat conduction between the inner side 210 of the rim 200 and the wheel electronics unit 100 can be significantly reduced. An outer air gap is therefore formed between the heat protection portion 40 and the inner side 210 of the rim 200.

In order, in addition to the heat conduction between the inner side 210 of the rim 200 and the main body 20, also to improve the heat radiation in respect of the thermal influence on the wheel electronics unit 100, the heat protection portion 40 has been provided here with a heat reflection surface 42. Said heat reflection surface 42 is designed here as a metallic coating, in particular having aluminum. A corresponding heat radiation which now impinges on said heat reflection surface 42 from the inner side 210 of the rim 200 is correspondingly largely thrown back and therefore heating up of the main body 20 and in particular of the wheel electronics unit 100 is avoided or at least reduced.

Figure 4:
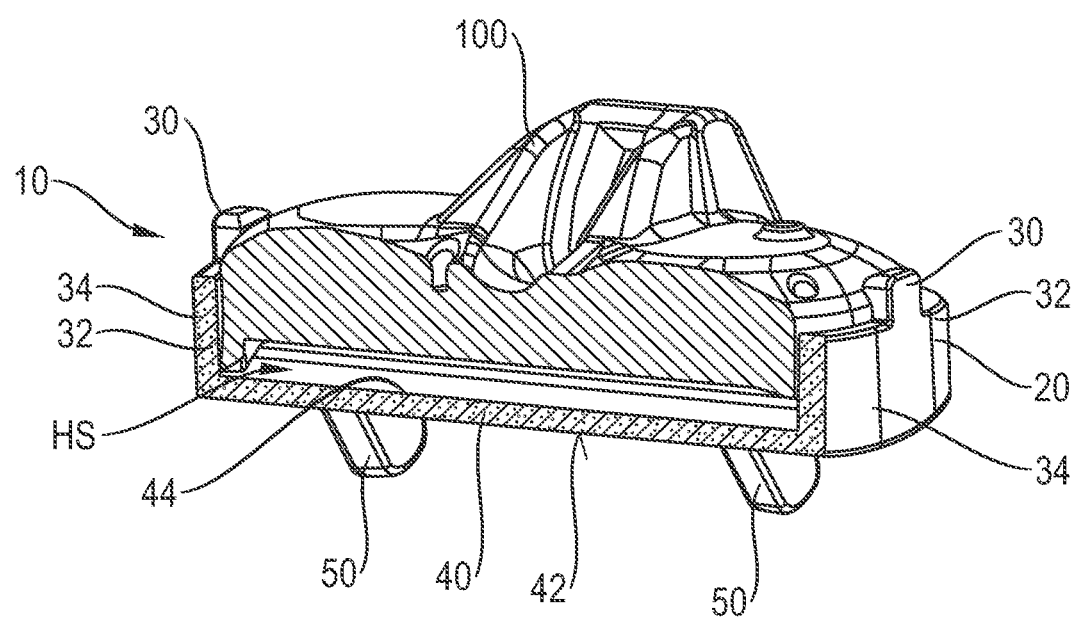
FIG. 4 shows the embodiment of FIGS. 1 to 3 in a first sectional illustration.
Figure 5:
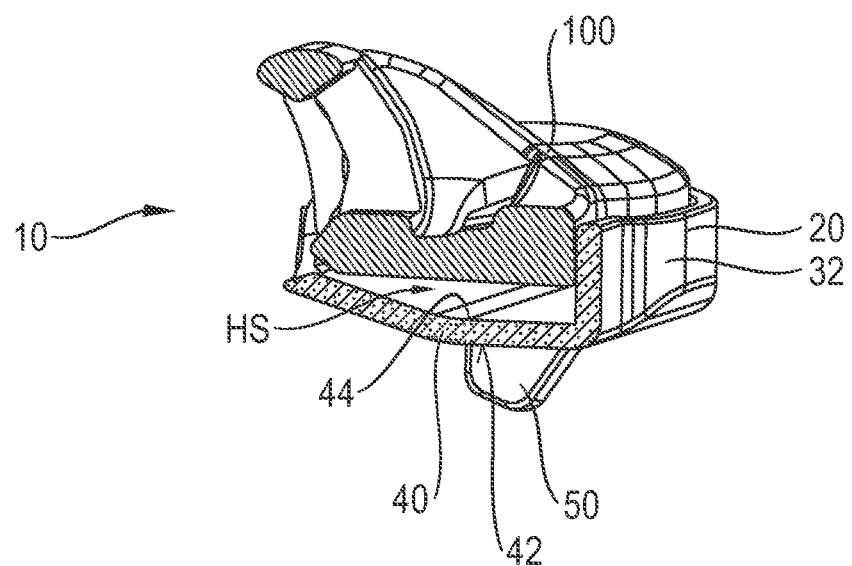
FIG. 5 shows the embodiments of FIGS. 1 to 4 in a second sectional illustration.

As a third and here combined additional thermal insulating effect, the production of an inner heat protection gap HS can be seen in FIGS. 4 and 5. In the region of the heat protection portion 40, an air gap with respect to the wheel electronics unit 100 is now formed by the inner geometrical shaping. Said air gap now prevents a transition in the form of heat conduction in a direct manner from the main body 20 in the heat protection portion 40 to the wheel electronics unit 100.

As is apparent from the above explanation, three different thermal insulation mechanisms are combined here in order to be able to further improve the thermal protection of the wheel electronics unit 100. Of course, this is just one combined illustration of this embodiment since the individual thermal insulation mechanisms can also provide the insulating effect separately or in another combination in the manner according to aspects of the invention.

For the fastening of the heat protection device 10 to the wheel electronics unit 100, firstly a guide portion 34 is provided here, which ensures guidance into the mounted position according to FIGS. 1 to 5. Said guide portion 34 corresponds here to an interlocking portion 32 such that the main body 20 can be pushed over the wheel electronics unit 100 in a shoe-like manner. As can be readily seen in the fastened position according to FIGS. 1 to 5, the fastening portions 30 are designed here as a snap and latching connection in order to secure the fastened position in the manner illustrated.

The above explanation of the embodiments describes the present invention exclusively within the scope of examples. Of course, individual features of the embodiments, if technically expedient, can be freely combined with one another without departing from the scope of the present invention.

What is claimed is:

1. A heat protection device for a wheel electronics unit on a rim of a wheel of a vehicle, said heat protection device comprising:
    a main body having (i) an interior space for receiving the wheel electronics unit in a fastened position, the interior space being formed by a lower wall and side walls extending from the lower wall, (ii) a floor surface defined on the lower wall, the floor surface being oriented to face the wheel electronics unit, (iii) a fastening portion on one of the side walls for fastening to the wheel electronics unit in the fastened position, and
    at least one heat protection portion for thermally insulating the wheel electronics unit in the fastened position, wherein the heat protection portion comprises a spacer foot that extends from the lower wall to directly contact the rim of the wheel such that a space is formed between the rim of the wheel and the lower wall of the main body.

2. The heat protection device as claimed in claim 1, wherein the fastening portion is configured to be fastened to the wheel electronics unit by way of either snapping or latching action.

3. The heat protection device as claimed in claim 1, wherein the heat protection portion further comprises a heat reflection surface defined on a lower surface of the lower wall that faces the rim for reflecting radiant heat from an inner side of the rim.

4. The heat protection device as claimed in claim 1, wherein the main body has an interlocking portion in a region of the fastening portion for interlocking contact connection to the wheel electronics unit.

5. The heat protection device as claimed in claim 1, wherein the main body has a guide portion for a guided movement into a position fastened to the wheel electronics unit.

6. The heat protection device as claimed in claim 1, wherein the heat protection portion has a gap region that forms a defined heat protection gap (HS) between the floor surface of the main body and a lower surface of the wheel electronics unit in the fastened position.

7. The heat protection device as claimed in claim 1, wherein the heat protection portion has a thermally insulating portion that is integrally formed with the main body.

8. A sub-assembly comprising the wheel electronics unit and the heat protection device of claim 1.

9. A wheel of a vehicle comprising the heat protection device and the wheel electronics unit of claim 1, wherein the heat protection device and the wheel electronics unit are mounted to each other in a space defined between the rim and a tire that is mounted to the wheel.

10. A heat protection device for a wheel electronics unit on a rim of a wheel of a vehicle, said heat protection device comprising:
   a main body having (i) an interior space for receiving the wheel electronics unit in a fastened position, the interior space being formed by a lower wall and side walls extending from the lower wall, (ii) a floor surface defined on the lower wall, the floor surface being oriented to face the wheel electronics unit, (iii) a fastening portion on one of the side walls for fastening to the wheel electronics unit in the fastened position, and
   at least one heat protection portion for thermally insulating the wheel electronics unit in the fastened position, wherein the heat protection portion comprises a gap region that forms a defined heat protection gap (HS) between the floor surface of the main body and the wheel electronics unit in the fastened position.

11. The heat protection device as claimed in claim 10, wherein the heat protection portion further comprises a heat reflection surface defined on a lower surface of the lower wall that faces the rim for reflecting radiant heat from an inner side of the rim.

12. A wheel of a vehicle comprising the heat protection device and the wheel electronics unit of claim 10, wherein the heat protection device and the wheel electronics unit are mounted to each other in a space defined between the rim and a tire that is mounted to the wheel.

13. A heat protection device for a wheel electronics unit on a rim of a wheel of a vehicle, said heat protection device comprising:
   a main body having (i) an interior space for receiving the wheel electronics unit in a fastened position, the interior space being formed by a lower wall and side walls extending from the lower wall, (ii) a floor surface defined on the lower wall, the floor surface being oriented to face the wheel electronics unit, (iii) a fastening portion on one of the side walls for fastening to the wheel electronics unit in the fastened position, and
   at least one heat protection portion for thermally insulating the wheel electronics unit in the fastened position, wherein the heat protection portion comprises a heat reflection surface defined on a lower surface of the lower wall that faces the rim for reflecting radiant heat from an inner side of the rim.

14. A wheel of a vehicle comprising the heat protection device and the wheel electronics unit of claim 13, wherein the heat protection device and the wheel electronics unit are mounted to each other in a space defined between the rim and a tire that is mounted to the wheel.

* * * * *